Jan. 3, 1928.
E. WILDHABER
1,655,080
METHOD OF PRODUCING GEARS
Filed Feb. 19, 1926    2 Sheets-Sheet 1
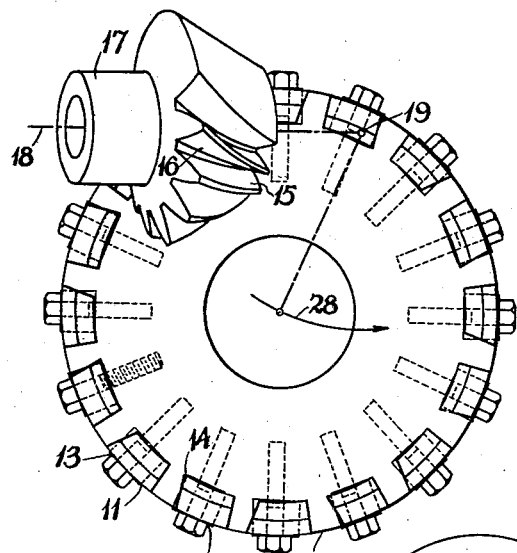
Fig.1
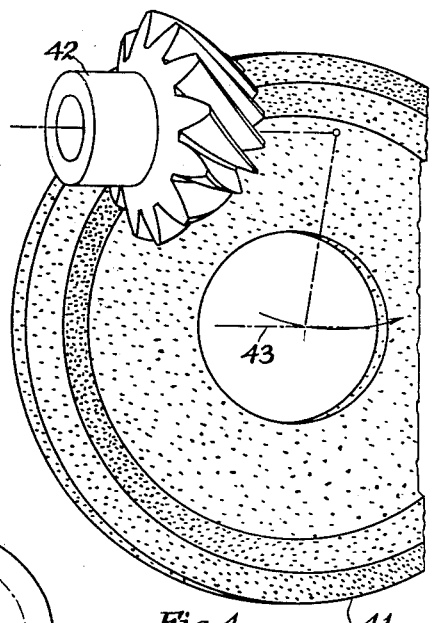
Fig.4
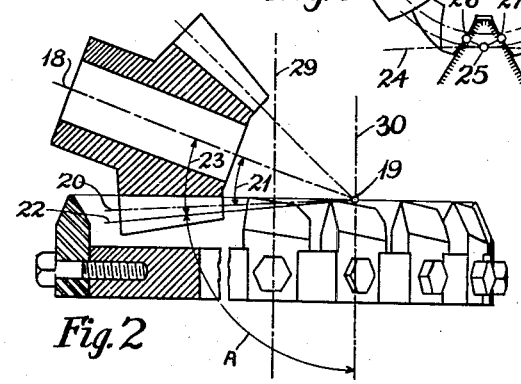
Fig.5
Fig.2
Fig.3
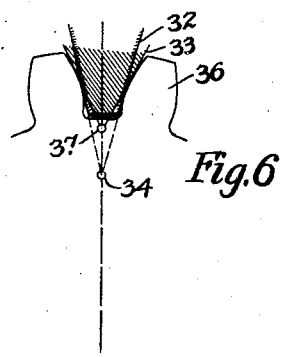
Fig.6
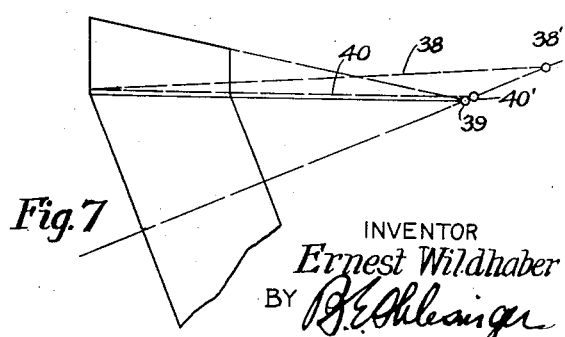
Fig.7
INVENTOR
Ernest Wildhaber
BY
ATTORNEY Jan. 3, 1928.　　　　　　　　　　　　　　　　　　　　　1,655,080
E. WILDHABER
METHOD OF PRODUCING GEARS
Filed Feb. 19, 1926　　　　2 Sheets-Sheet 2

INVENTOR
*Ernest Wildhaber*
BY
ATTORNEY

Patented Jan. 3, 1928.

1,655,080

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

METHOD OF PRODUCING GEARS.

Application filed February 19, 1926. Serial No. 89,479.

The present invention relates to a method of producing gears and particularly to a method of producing gears from tapered blanks.

The primary object of the present invention is to provide a method for cutting two side tooth surfaces of a tapered gear blank simultaneously.

A further object of the invention is the provision of a method for cutting tapered gears which will produce gears of increased strength.

Other objects of the invention will be apparent hereinafter from the specification and from the recital of the appended claims.

In the accompanying drawings I have illustrated several embodiments of my invention. It will be understood, however, that the invention is capable of further modification within its scope and within the limits of the accompanying claims.

In the drawings:

Figs. 1 and 2 are a plan view and a side elevation respectively, showing one method of producing gears according to this invention;

Fig. 3 is a side elevation, partly in section, showing a slightly modified way of producing curved tooth gears according to this invention;

Fig. 4 is a plan view illustrating the manner of grinding curved tooth gears according to this invention;

Fig. 5 is an end elevation showing, somewhat diagrammatically, the preferred manner of applying the generating roll;

Figs. 6 and 7 are an end elevation and a side elevation respectively, illustrating diagrammatically one of the fundamental advantages of the present method;

Figures 8, 11:
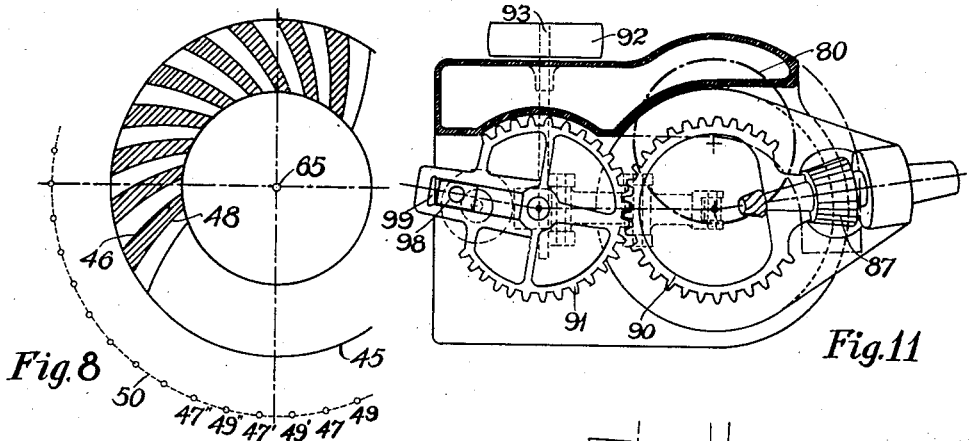
Fig. 8 is a plan view of a spherical profile crown gear such as might be constructed with this invention.
Figs. 11 and 12 are a side elevation, partly in section, and a transverse sectional view, respectively, of a machine such as might be employed in practising this invention.

It is well known that an involute spur gear will roll with racks of different pressure angles. It will roll with a rack whose pressure angle is the same as the pressure angle of its tooth surfaces and with any rack whose normal pitch is the same as the normal pitch of this basic rack, the normal pitch being the distance from tooth to tooth of the rack measured normal, or perpendicular, to the tooth sides of the rack. By analogy, a bevel gear may roll with different crown gears or different mate gears. I have discovered that it is possible to use a tool whose pressure angle is different from the pressure angle of the tooth to be cut and by imparting a proper rolling motion between said tool and the gear blank to produce a tapered gear of the desired pressure angle.

The present invention permits of cutting two adjacent tooth surfaces of the blank simultaneously without decreasing the strength of the teeth so produced as compared with the strength of the teeth of tapered gears whose tooth surfaces are cut one side at a time. Heretofore, it has only been possible to cut tapered gears two sides simultaneously by using male and female tools and cutting the teeth with "parallel" or uniform depth or by so cutitng the blank with a male tool that the bottoms of the tooth spaces lie on conical surfaces whose apex is outside the pitch cone apex of the blank. The "parallel" depth method of cutting produces a gear whose teeth are weak at their inner ends because the height of the tooth remains constant while its width and the size of the blank diminish and because the gear teeth produced with a male tool are of excessively tapering thickness (while the gear teeth produced by the female tool are of constant thickness). The other method of cutting, referred to, produces a gear whose teeth are weak at their outer ends because of the increased depth of the tooth there as compared with its depth at its inner end. The present invention enables tapered gears to be cut two sides simultaneously in a manner such that the bottoms of the tooth spaces lie on a cone whose apex coincides with or substantially coincides with the pitch cone apex of the blank. In other words, the present invention permits of the production of tapered gears whose teeth are of gradually decreasing depth from their outer to their inner ends and whose depth decreases in proportion to the taper of the gear itself in an operation which is very rapid.

Referring to the drawings by numerals of reference. Figs. 1 and 2 illustrate one method of producing longitudinally curved tooth gears with this invention. 10 indicates a rotary annular face mill provided with a plurality of cutting blades. These cutting blades in the form shown are arranged in pairs, alternate blades 11 and 12 cutting opposite side faces of the teeth of the blank. The finish cutting edges 13 and 14 of these blades are made with different side or pressure angles, each side having preferably a greater side or pressure angle, than the pressure angle of the tooth faces 15 and 16 of the gear 17 to be cut thereby. In producing a curved tooth gear with this tool, the cutter 10 will be rotated on its axis and simultaneously therewith a relative rolling motion will be imparted between the tool and the blank to generate the tooth profiles.

Ordinarily in producing a tapered gear, the tooth profiles are generated by a rolling motion in which the pitch surface of the blank rolls on the pitch surface of the gear which the tool represents. With the present invention, the blank will roll in the manner of a cone of different dimension, preferably of greater dimension, than its pitch cone, rolling on the pitch surface of the gear which the tool represents. This is illustrated in Figs. 2, 3 and 5, where 18 indicates the axis of the blank, 19 its apex, 20 its pitch surface, 21 its pitch cone angle, 22 the rolling surface of the blank during generation, and 23 the cone angle of this surface. The cone surface 22, which in the embodiment shown lies outside of the pitch surface 20 of the blank, rolls on the pitch surface 24 of the gear which the tool represents. In Fig. 5, 25 indicates the instantaneous axis or point of rolling movement of tool and blank at any instant and 26 and 27 indicate points of contact between the tool and blank.

The modified rolling motion employed in practising this invention permits of producing gears of the desired pressure angle with a tool whose pressure angle is greater than this desired angle. At the same time, as will be explained more fully hereinafter, two tooth sides may be cut simultaneously without decreasing the strength of the gear as compared with gears whose tooth surfaces are cut one side at a time.

The rolling motion employed may be of any desired character. It may be applied wholly to the tool or to the blank or be divided between them. The drawings illustrate a motion in which the blank rotates on its axis and the tool is translated in the direction of the arrow 28 (Fig. 1) about the apex 19 of the blank or the axis of the crown gear or gear with which the blank rolls during generation.

In Fig. 2 the blank rolls on the pitch surface of a nominal crown gear, that is, a crown gear whose pitch cone angle A is somewhat less than 90°. The top surface of such a crown gear is a plane. Such a crown gear is employed in the Gleason spiral bevel generator. Here the axis 29 of the tool is placed parallel to the axis 30 of the nominal crown gear which the tool represents. In Fig. 3 the blank rolls on the pitch surface of a true crown gear, that is, the pitch surface of a crown gear whose pitch cone angle B is 90°. Here the axis 29 of the tool is inclined to the axis 31 of the crown gear.

If gears could be cut with a tool whose sides actually converged to a point, it would be possible to cut two tooth surfaces simultaneously and still make the groove bottoms intersect the pitch cone apex. But in practice it is necessary to use tools of appreciable width at their tips. The sides of such tools will converge if prolonged at a point somewhere below the tooth surface to be cut. Consequently, in cutting two side faces simultaneously, the groove bottoms cannot be made to intersect exactly the pitch cone apex. The nearer, however, the theoretical point of convergence of the tool sides is to the groove bottom, the more closely will the apex of the groove bottom cone surface approach the pitch cone apex of the blank and the stronger the teeth produced will be.

The advantages of the present method of cutting are illustrated diagrammatically in Figs. 6 and 7. In these figures, 32 indicates a tool whose pressure angle is the same as the pressure angle of the tooth to be produced while 33 indicates a tool, such as might be employed in this invention, whose pressure angle is greater than the pressure angle of the teeth to be cut. It will be noted that the sides of the tool 32 converge at a point 34 which is a substantial distance below the bottom of the groove or slot intermediate the gear teeth 36, while the sides of the tool 33 converge at a point 37 which lies but a slight distance below the tooth groove bottom. In cutting tapered gears with teeth of tapering depth two sides simultaneously, with a tool of usual pressure angle, as tool 32, the groove bottoms will be parts of a cone surface such as 38 whose cone apex 38' lies a considerable distance outside of the pitch cone apex 39 of the blank. By decreasing the distance of the intersection point of the tool sides from the tooth bottom, as by employing a tool 33 of increased pressure angle, the groove bottoms may be made parts of a cone surface 40, in the present invention, whose apex 40' coincides with or substantially coincides with the pitch cone apex 39 of the blank. The advantage of this construction is that the teeth taper in depth in proportion to the taper of the gear itself and consequently the profile of the teeth is the same throughout their length, the teeth are of substantially uniform strength throughout their length and are uniformly free of interference or undercut. The present invention may be applied to the production of straight tooth gears as well as curved tooth gears. The tooth groove bottoms of the straight tooth gears will lie on the cone surface 40. By selecting suitable curves for the lengthwise curvature of the teeth of curved tooth gears produced with this invention, the bottoms of the grooves may be made to actually pass through the cone apex.

Fig. 4 illustrates one application of the present invention to the grinding of gears. The rotary annular grinding wheel 41, the pressure angle of whose sides is larger than the pressure angle of the tooth sides to be ground, is rotated in engagement with the gear 42 in the same way in which the tool 10 moves. That is, the wheel rotates on its axis 43 while a relative rolling movement is imparted between the tool and the gear in which the blank rolls with a cone of different dimension than its pitch cone on the pitch surface of the gear which the tool represents. This invention has a special advantage in grinding, since the grinding stock of a grinding wheel may be made larger than that of grinding wheels whose pressure angles are the same as those of the tooth surfaces to be ground. The increase in pressure angle provides increased material in the wheel. This gives increased strength and longer life.

The tools shown in Figures 1 to 6 have straight side cutting edges and represent basic gears whose teeth are of straight profile. The present invention may be applied also to the production of gears whose tooth surfaces are conjugate to spherical surfaces. Fig. 8 illustrates a crown gear 45 provided with longitudinally curved spherical tooth surfaces. The convex pitch lines 46 are arcs of circles whose centers are at 47, 47', 47'', etc., while the concave pitch lines 48 are arcs of circles whose centers are at 49, 49', 49'', etc. The centers 47, 47', 47'', and 49, 49', 49'', all lie on the same circle 50. The tooth surfaces of this crown gear are parts of convex and concave spherical tooth surfaces. The convex tooth surfaces of the crown gear are parts of convex spherical surfaces whose centers 51, 51', 51'', etc., lie on a circle 54, which appears as a straight line in Fig. 9, which is situated below the pitch plane 52 of the crown gear. The concave tooth surfaces are parts of concave spherical surfaces whose centers 53, 53', 53'', etc., lie on a circle 55 which is situated above the pitch plane of the crown gear. For producing theoretically correct gearing the distance of the circle 55, above the pitch plane 52 should be the same as the distance of the circle 54 below that plane.

Figures 9, 12:
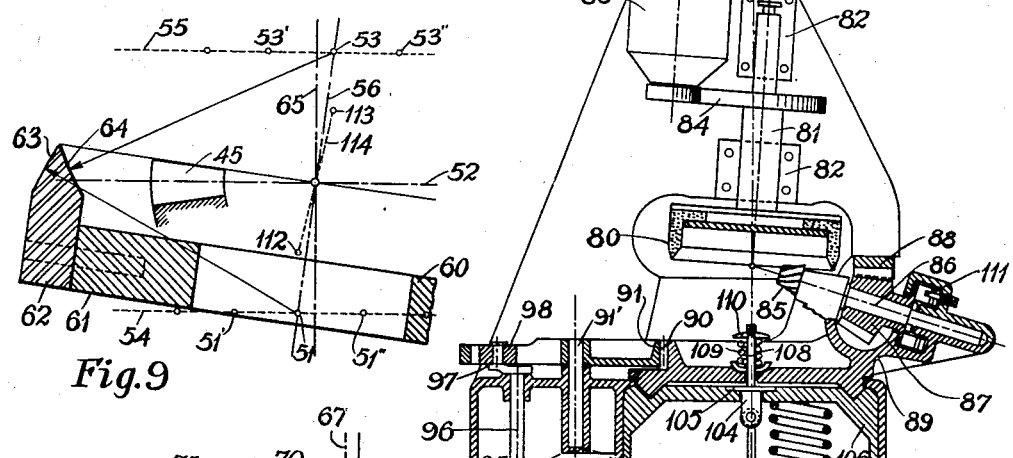
Fig. 9 is a sectional view showing the position of the spherical face mill in cutting a gear conjugate to the crown gear of Fig. 8.

To produce a gear conjugate to the crown gear 45, the axis 56 of the tool must be so inclined as to pass through the center 51 of a convex spherical tooth surface and also through the center 53 of a concave spherical tooth surface. In other words, the axis 56 must be the connecting line between the two centers, as shown in Fig. 9. A rotary face mill 60 is shown in this position in this figure. It consists of a body portion 61 and a number of inserted blades 62 whose outside and inside cutting edges, 63 and 64 respectively, are parts of convex and concave spherical surfaces, respectively, having the same radius as the tooth surfaces to be represented and whose centers coincide with the centers 51 and 53 respectively, during the cut. The cutting operation as already described consists of a rotary motion of the tool and a simultaneous relative rolling movement between the tool and blank, in which the rolling surface of the blank is a cone of different and preferably greater cone angle than the pitch cone angle of the blank.

Figure 10:
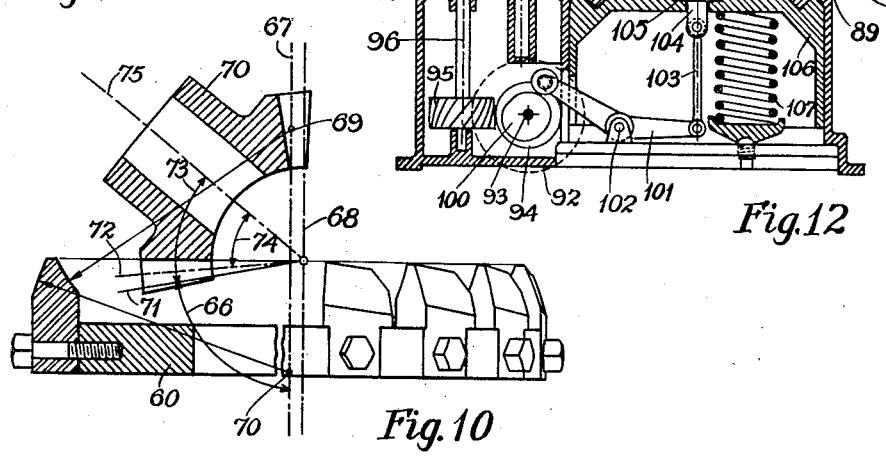
Fig. 10 is a side elevation, partly in section, illustrating a somewhat modified method of producing a bevel gear conjugate to a spherical profile crown gear.

Fig. 10 illustrates a slightly modified way of generation in which the crown gear is of a modified form. Here the cutter 60 represents and constitutes a tooth of a nominal crown gear, the pitch surface of which is not exactly a plane, but a conical surface, having its pitch cone angle 66 slightly less than 90°. This form of crown gear, as already explained, is employed in the Gleason spiral bevel gear generator. Here the axis 67 of the tool is parallel to the axis 68 of the crown gear, but again passes through the sphere centers 69 and 70 of the tooth profiles.

In producing gears whose tooth surfaces are conjugate to spherical surfaces of revolution, with this invention, the same relative rolling movement already described is imparted between tool and blank. In this relative rolling movement the blank 70 whose axis is at 75 rolls as though with a surface 71 preferably outside its pitch surface 72 on the pitch surface of the gear represented by the tool. As illustrated in Fig. 10, the cone angle 73 of the rolling surface is greater than the pitch cone angle 74.

One form of machine such as might be employed in producing a gear according to this invention is illustrated in Figs. 11 and 12. The tool employed is shown as a grinding wheel 80 of circular arc profile. This tool is mounted on a spindle 81 which is journaled in suitable bearings 82 in the frame of the machine and which is driven from any suitable source of power as a motor 83 through the spur gearing 84. The blank 85 is mounted on the spindle 86. To produce the required rolling motion between the tool and blank during cutting, a master gear 87 is secured to the blank spindle 86. This master gear will have a pitch cone larger than the pitch cone of the blank or will be so positioned as to roll on a conical surface other than its pitch cone surface. This master gear meshes with a gear segment 88 which is secured to the frame of the machine. The pitch cone angle of the gear segment 88 is that of the gear which the tool represents. If a true crown gear it is 90°. If a nominal crown gear, it will be something slightly less than 90°. If the gear being produced is the generated member of a gear pair in which one member is non-generated, the pitch cone angle of the segment 88 may be the same or approximately the same as the pitch cone angle of the gear with which the gear being produced is to mesh. The rolling motion is imparted to the blank spindle as follows: The blank spindle 86 is journaled in suitable bearings in the oscillatable carrier 89. The carrier 89 has formed on its periphery a spur gear segment 90 which meshes with a spur gear segment 91 which is secured to the spindle 91' which is journaled in a suitable bearing in the frame of the machine. The segment 91 is oscillated to cause the blank spindle to roll across the face of the tool. The oscillatory movement of the segment 91 is derived from a pulley 92, or any other suitable source of power. This pulley 92 is mounted on a shaft 93 to which is keyed a helical gear 94 meshing with a helical gear 95 which is keyed to a vertical shaft 96 which is journaled in the frame and to which is secured at its upper end a crank member 97 which is connected through the block 98 and slot 99 with the segment 91. Through the means described an oscillatory movement is imparted to the carrier 89 causing the master gear 87 to roll on the gear segment 88. The gear blank rolls in one direction for generation and is withdrawn during the indexing period. The withdrawing mechanism shown comprises a cam 100 which is secured to the shaft 93 and which actuates the bell crank lever 101 which is pivoted at 102 to the frame. The bell crank lever is connected through the link 103 with a member 104 which is provided with a flange 105 seating in a suitable recess in a cylindrical support 106 which is slidably mounted in the frame. The carrier 89 is mounted rotatably on this support 106. Normally, that is, during the cutting operation the carrier is held in the position shown, with the master gear 87 in engagement with the gear segment 88, by means of the powerful coil spring 107 which is interposed between the support 106 and the base of the frame. When the bell crank lever is rocked about its pivot 102 the support 106 and the carrier 89 are forced down against the resistance of the spring 107 to withdraw the master gear from engagement with the segment 88. A stud 108 on the flanged member 104 passes through the carrier 89. A coil spring 109 mounted on this stud and interposed between the washers 110 serves to retain the carrier at all times in position on the support 106. The withdrawal of the blank from cutting position and the reversal of movement of the carrier permit of indexing, a brake 111 preventing rotation of the blank spindle during reversal. The blank turns only during the cutting stroke and is indexed one or more teeth, preferably several teeth, during the time it is out of engagement with the tool.

Instead of producing both members of a pair of generated gears with a tool of increased pressure angle, one member may be produced in the usual way and the other member, preferably the pinion, produced according to the method of this invention. In this case, should it be desired to produce gears conjugate to a crown gear whose tooth surfaces are spherical, it will be necessary, to produce theoretically accurate teeth, to so set the axis of the tool used to produce the gear being generated by the new method that the sphere centers 51 and 53 of the tooth surfaces of this gear will be at the same distance from the apex of the crown gear as the centers 112 and 113 of the tool employed to produce in the usual method the other gear. This is indicated diagrammatically in Fig. 9, where the axis 114 of the tool employed to produce the mate gear by the usual method is inclined to the drawing plane at such an angle that the sphere centers 112 and 113 of the cutting edges of the tool are at the same distance from the apex as the centers 51 and 53 are. Theoretically correct mating gears may also be cut with this invention by using tools of different increased pressure angles.

In generating curved tooth bevel gears in the usual rolling motion about two intersecting axes, with spherical tools of different pressure angles, the sphere radii of the cutting edges of the tools should be the same. In this case, the cutter diameters will be unequal.

The present invention is applicable to the production of gears where both members are generated or where only one member is generated and that by a rolling movement of the blank substantially on the pitch surface of the non-generated member. It is applicable to the production of both bevel and hypoid gears.

While I have illustrated certain preferred embodiments of my invention, it will be understood that this invention is capable of further modification within the limits of the disclosure and the scope of the appended claims and that this application is intended to cover any variations, uses, or adaptations of my invention, following, in general, the principles of the invention and including such departures from the present disclosure as come within known or customary practice in the gear art and as may be applied to the essential features hereinbefore set forth and as fall within the limits of the accompanying claims.

Having thus described my invention, what I claim is:

1. The method of producing gears which consists in cutting two adjacent side faces of a gear blank simultaneously by moving a pair of cutting edges adapted to cut opposite side faces of the gear teeth and having pressure angles greater than the pressure angles of the tooth sides to be cut thereby, across the face of a tapered gear blank while imparting a relative rolling movement between said tool and blank in the manner of a conical body of different dimension than the pitch cone of the blank rolling on the pitch surface of the gear represented by said cutting edges.

2. The method of producing gears which consists in cutting two adjacent side faces of a gear blank simultaneously by moving a tool, whose side cutting edges have pressure angles greater than the pressure angles of the tooth sides to be cut thereby, across the face of a tapered gear blank while imparting a relative rolling movement between said tool and the blank in the manner of a cone of greater dimension than the pitch cone of the blank rolling on the pitch surface of the gear which the tool represents.

3. The method of producing gears which consists in moving a pair of cutting edges adapted to cut opposite side tooth faces of the gear teeth and having pressure angles greater than the pressure angles of the tooth sides to be cut thereby, in concentric curved paths across the face of a tapered gear blank to produce two tooth faces on the blank simultaneously, and simultaneously imparting a relative rolling motion between the cutting edges and blank as though the blank were rolling with a cone of greater dimension than its pitch cone on the pitch surface of a basic gear represented by said cutting edges.

4. The method of producing gears which consists in selecting a tool, provided with separate side cutting edges whose pressure angles are greater than the pressure angles of the tooth sides to be cut thereby, moving said tool in a curved path across the face of the blank to produce two tooth faces on the blank simultaneously, and simultaneously imparting a relative rolling motion between tool and blank in the manner of a cone of different dimension than the pitch cone of the blank rolling on the pitch surface of the gear which the tool represents.

5. The method of producing gears which consists in selecting a tool, provided with separate side cutting edges whose pressure angles are greater than the pressure angles of the tooth sides to be cut thereby, moving said tool in a curved path across the face of the blank to produce two tooth surfaces on the blank simultaneously and simultaneously imparting a relative rolling motion between tool and blank in the manner of a cone of greater dimension than the pitch cone of the blank rolling on the pitch surface of the gear which the tool represents.

6. The method of producing gears which consists in selecting a rotary annular tool, provided with a plurality of finish cutting edges, certain of which are adapted to cut one side face of the blank and others a different side face and each of which is of greater pressure angle than the pressure angle of the tooth side to be cut thereby, and rotating said tool in engagement with the blank while imparting a relative rolling movement between said tool and blank in the manner of a cone of different dimension than the pitch cone of the blank rolling on the pitch surface of the gear which the tool represents.

7. The method of producing gears which consists in selecting a rotary annular tool, provided with a plurality of finish cutting edges, certain of which are adapted to cut one side face of the blank and others a different side face and each of which is of greater pressure angle than the pressure angle of the tooth side to be cut thereby, and rotating said tool in engagement with the blank while imparting a relative rolling movement between said tool and blank in manner of a cone of greater dimension than the pitch cone of the blank rolling on the pitch surface of the gear which the tool represents.

8. The method of producing gears which consists in selecting a rotary annular tool, provided with a plurality of finish cutting edges of circular profile, certain of which are adapted to cut one side face of the blank and others a different side face and each of which is of greater pressure angle than the pressure angle of the tooth side to be cut thereby, and rotating said tool in engagement with the blank while imparting a relative rolling motion between said tool and blank in the manner of a cone of different dimension than the pitch cone of the blank rolling on the pitch surface of the gear which the tool represents.

9. The method of producing gears which consists in selecting a rotary annular tool, provided with a plurality of finish cutting edges of circular profile, certain of which are adapted to cut one side face of the blank and others a different side face and each of which is of greater pressure angle than the pressure angle of the tooth side to be cut thereby, and rotating said tool in engagement with the blank while imparting a relative rolling motion between tool and blank in the manner of a cone of greater dimension than the pitch cone of the blank rolling on the pitch surface of the gear which the tool represents.

10. The method of producing tapered gears which consists in moving a tool, having a side cutting edge whose pressure angle is greater than the pressure angle of the tooth side to be cut thereby, across the face of a tapered gear blank while imparting a relative rolling movement between tool and blank in the manner of a cone of greater dimension than the pitch cone of the blank rolling on the pitch surface of the gear which the tool represents.

11. The method of producing tapered gears which consists in moving a tool, having a side cutting edge whose pressure angle is greater than the pressure angle of the tooth side to be cut thereby, in a curved path across the face of a tapered gear blank while imparting a relative rolling movement between said tool and blank in the manner of a cone of greater dimension than the pitch cone of the blank rolling on the pitch surface of the gear which the tool represents.

12. The method of producing tapered gears which consists in rotating a tool, provided with an annular cutting portion whose pressure angle is greater than the pressure angle of the tooth surface to be cut, in engagement with a gear blank while imparting a relative rolling motion between said tool and blank in the manner of a cone of greater dimension than the pitch cone of the blank rolling on the pitch surface of the gear which the tool represents.

13. The method of producing longitudinally curved tooth gears which consists in rotating a tool, provided with an annular cutting portion of circular profile whose pressure angle is greater than the pressure angle of the tooth surface to be cut, in engagement with a gear blank while imparting a relative rolling movement between said tool and blank in the manner of a cone of greater dimension than the pitch cone of the blank rolling on the pitch surface of a gear which the tool represents.

ERNEST WILDHABER.